United States Patent
Zhang et al.

(10) Patent No.: US 9,349,002 B1
(45) Date of Patent: May 24, 2016

(54) ANDROID APPLICATION CLASSIFICATION USING COMMON FUNCTIONS

(71) Applicants: Lei Zhang, Nanjing (CN); Zhentao Huang, Nanjing (CN); Franson Fang, Nanjing (CN)

(72) Inventors: Lei Zhang, Nanjing (CN); Zhentao Huang, Nanjing (CN); Franson Fang, Nanjing (CN)

(73) Assignee: Trend Micro Inc., Tokyo (JP)

( * ) Notice: Subject to any disclaimer, the term of this patent is extended or adjusted under 35 U.S.C. 154(b) by 71 days.

(21) Appl. No.: 13/904,291

(22) Filed: May 29, 2013

(51) Int. Cl.
    *G06F 21/56* (2013.01)

(52) U.S. Cl.
    CPC .............. *G06F 21/56* (2013.01); *G06F 21/563* (2013.01); *G06F 21/564* (2013.01)

(58) Field of Classification Search
    CPC ................................ G06F 21/56; G06F 21/563
    See application file for complete search history.

(56) References Cited

U.S. PATENT DOCUMENTS

| | | | |
|---|---|---|---|
| 8,869,284 B1 * | 10/2014 | Mao | 726/24 |
| 2011/0302654 A1 * | 12/2011 | Miettinen | G06F 21/566 |
| | | | 726/23 |
| 2014/0181973 A1 * | 6/2014 | Lee et al. | 726/23 |

* cited by examiner

*Primary Examiner* — Kaveh Abrishamkar
*Assistant Examiner* — Tri Tran
(74) *Attorney, Agent, or Firm* — Beyer Law Group LLP

(57) ABSTRACT

Known malicious Android applications are collected and their functions are extracted. Similarity values are calculated between pairs of functions and those functions with a low similarity value are grouped together and assigned a unique similarity identifier. A common set of functions or common set of similarity identifiers are identified within the applications. If at least one function in the common set is determined to be malicious then the common set is added to a blacklist database either by adding functions or by adding similarity identifiers. To classify an unknown Android application, first the functions in the application are extracted. These functions are then compared to the set of functions identified in the blacklist database. If each function in the set of functions is present (either by matching or by similarity) in the group of extracted functions from the unknown application then the unknown application is classified as malicious.

7 Claims, 8 Drawing Sheets

Functions in Android Applications

Blacklist Creation System

Application Classification System

Functions in Android Applications

| ID | APKID | Signature | Checksum |
|---|---|---|---|
| 10554 | 22 | B[G] B[ ] B[R] B[G] B[ ] | sparse_switchconst<br>40 return const<br>41 gotonopsparse_switch_payload |

622　624　626　628

| Class Name | Function Name | Parameters | Sim.ID |
|---|---|---|---|
| Lcom/hp/hpl/sparta/ parsecharstream; | isExtender | (Ljava/lang/string;/ Lobject;)V | 18 |

630　632　634　636

Function Information Table

| ID | Function Set | Checked ? |
|---|---|---|
| 179 | 844,845,846,847,848,849, 850,851,852,853,7539 | 1 |
| 180 | 26811,26812,26815,26817, 26818,26819 | 0 |

Function Set Table

| ID | Function Set Identifier |
|---|---|
| 1 | 179 |

662　664

Blacklist Table

ANDROID APPLICATION CLASSIFICATION USING COMMON FUNCTIONS

FIELD OF THE INVENTION

The present invention relates generally to detection of malicious software. More specifically, the present invention relates to malicious software detected in an Android software application.

BACKGROUND OF THE INVENTION

Fueled in part by the explosion in use of mobile telephones, Android devices are becoming the most popular intelligent device in the world. Currently, the Android operating system is the worlds most widely used smartphone platform and the operating system is also being used in a host of other electronic devices. In addition to the commonly recognized Android mobile telephones, Android devices (running the Android operating system) also include other mobile devices such as tablet computers, laptop computers, cameras, electronic readers, as well as many other electronic devices such as game playing consoles, desktop computers, car computers, televisions, etc.

Android is a Linux-based operating system and while most of its software applications are written in a custom version of the Java programming language, applications may also be written in the C and C++ languages. Even support for simple C and SDL applications may be made possible by minor modifications to its operating system. As with most other mobile telephone applications, these Android applications are written primarily by independent developers and the number of Android applications is growing very fast. For example, it is believed that the number of applications available on Google Play reached 900,000 as of April, 2013 and will reach 1,000,000 applications as of June of 2013. Android applications may also be obtained from developers directly.

Not surprisingly, the number of malicious Android applications is increasing as well. The antivirus software company Trend Micro, Inc. identified 25,000 Android malware samples in the second quarter of 2012, more than double the prediction of 11,000, and more than four times the 6,000 malware samples found in the previous quarter. Malicious software includes software that sends text messages from infected telephones to premium-rate telephone numbers, displaying intrusive advertisements on the device, sending personal information to unauthorized third parties, etc. While a variety of antivirus software companies have released antivirus software for Android devices, this software can be ineffective because all Android applications (including the antivirus applications) run in a "sandbox" (an isolated area that does not have access to many of the operating system's resources), thus limiting the ability to scan the entire operating system for malicious software. In addition, a user may grant an application permission to perform operations outside of the sandbox, potentially allowing malicious software to create problems.

This dramatic increase in malware found within Android software applications is problematic. And even though malware scanners exist within the Google Play Web site and within the Android operating system itself, it is believed that many malware applications are not detected. Due to the sheer number of Android applications, and the number of new applications being developed monthly, techniques are desired to determine whether a given Android application includes malicious software or not.

SUMMARY OF THE INVENTION

To achieve the foregoing, and in accordance with the purpose of the present invention, a classification technique is disclosed that is able to classify and unknown Android software applications as being malicious or not.

In a first embodiment, a blacklist for identifying malicious Android software applications identifies sets of functions that can identify a malicious application. Once any number of known malicious software applications are received, the functions from these applications are extracted. Pairs of functions are compared against one another and a similarity value for each comparison is calculated. A similarity value for a pair of functions that is less than a particular threshold value indicates that that pair functions may be considered similar to one another. By extension, if one of that pair functions is then compared to a third function and a similarity value is also less than a threshold value, then all three functions may be considered as being similar to each other. A common set of functions between the malicious applications is then determined, taking into account the similarity between functions. Once a common set of functions is determined (the set of functions need not appear in every one of the malicious applications), then this set of functions is added to a blacklist database by adding the set explicitly, adding a representation of the set, etc. The representation of the set of functions in the database can then be used to identify a malicious application. In order to reduce false positives, there is an optional requirement that at least one of the functions in the set of functions must be identified as being a malicious function.

In a second embodiment, a technique similar to the first embodiment is used and incorporates the concept of similarity identifiers. If two or more functions are deemed to be similar, then that group is assigned a unique similarity identifier. There may be many such groups of similar functions and each such group receives its own unique similarity identifier. These unique similarity identifiers may then be used in place of each of the similar functions in order to determine if a common set of similarity identifiers are present within the collection of known malicious software applications. A common set of similarity identifiers present within the unknown software applications is determined if this set of similarity identifiers is present in a certain number of the applications. By definition, a function may be deemed present within an application if a similar function is present in an application. In this embodiment, rather than adding the set of functions to a blacklist database, the set of similarity identifiers are added to the blacklist database.

In a third embodiment, a technique classifies unknown software applications. In a first step, and Android software application is received, it being unknown as to whether this software application is malicious or not. The functions present within this unknown applications are then extracted. Next, either the set of common functions or the set of common similarity identifiers are retrieved from the blacklist database. If all members of this set of functions are present in the group of functions extracted from the unknown application then the unknown application may be classified as malicious. A member of the set of functions need not be present verbatim in the group of functions; it is enough if a member of the set of functions has an equivalent in the group of functions either by being functionally equivalent or by having a similarity value less than a particular threshold value.

BRIEF DESCRIPTION OF THE DRAWINGS

The invention, together with further advantages thereof, may best be understood by reference to the following description taken in conjunction with the accompanying drawings in which:

FIG. 6 is illustrates one embodiment of a function information table that may be used to store function information into database.

FIG. 7 is a function sets table that may be used to represent the function sets determined.

FIG. 8 is an example of a blacklist table used to store malicious function sets within a database.

DETAILED DESCRIPTION OF THE INVENTION

In order to classify Android software applications more easily and efficiently, the below technique is able to classify unknown applications as being malicious or not using in part similarity and clustering technologies. In an analysis of the above-described problem, the inventors of the present application have realized that many malware samples belong to the same family of malware, and that variants within this family often use common functions. Further, it is realized that even though malware samples and normal applications may contain common functions, it is possible to remove these normal applications from a blacklist in order to reduce false positives. By identifying common functions used in malware samples within the same family of malware, a blacklist classification database may be built to identify unknown applications.

System Block Diagrams

Figure 1:
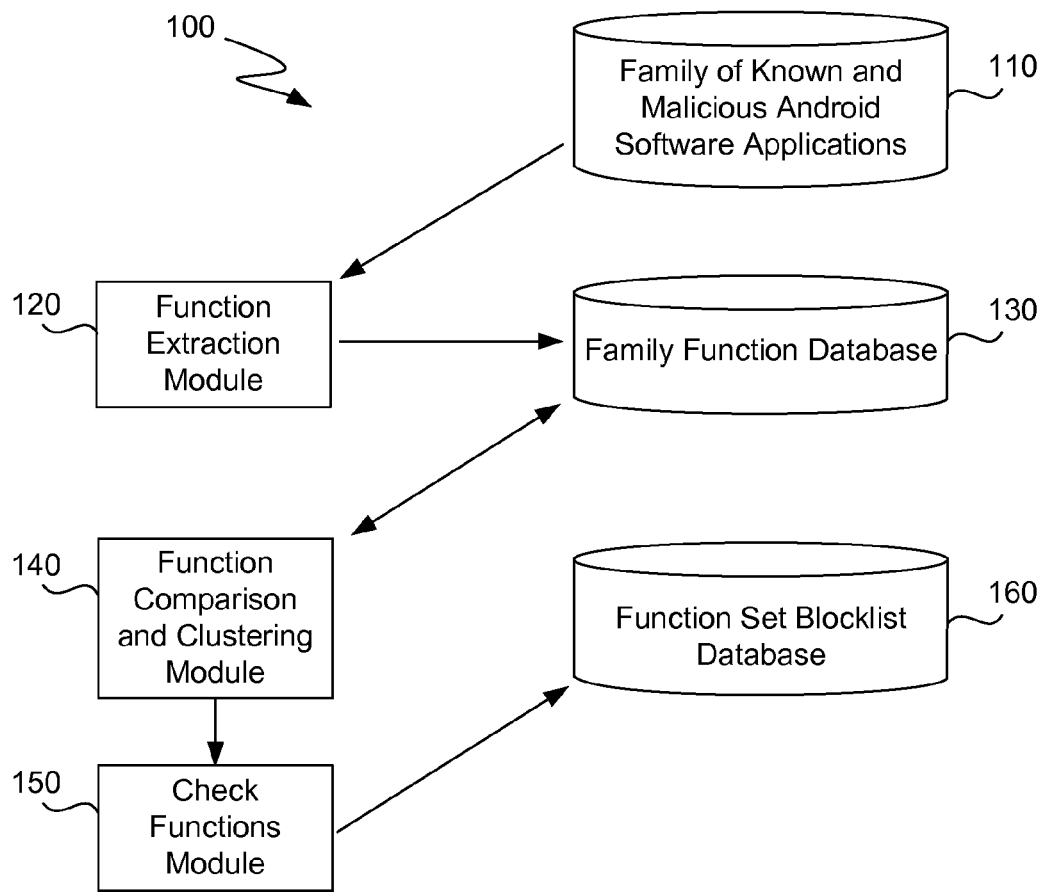
FIG. 1 is a block diagram for a blacklist creation system according to one embodiment of the invention.

FIG. 1 is a block diagram for a blacklist creation system 100 according to one embodiment of the invention. Database 110 is a collection of known malicious Android software applications that belong to a particular malware family of malware such as AndroidOS_TROJSMS.A or AndroidOS_FAKE.MC.A, as well as any other family of malware. It is not strictly necessary that database 110 be limited to a family of malware, in fact, database 110 may include any of a variety of different types of malicious applications. In one embodiment, there are numerous databases such as database 110 and each includes malware samples from a particular malware family. In another embodiment, a single database includes malware samples from any number of malware families and are grouped accordingly. Preferably, the applications in database 110 are in their binary representation, although applications in their source code representation may also be obtained and then later compiled, interpreted or translated into their binary representation. By starting with a collection of known malicious software applications, sets of functions may be developed from this collection that are indicative of a malicious application.

Software module 120 is arranged to identify and extract the functions found within the software applications in database 110. Once extracted, these functions along with other identifying information may be stored within family function database 130. Database 130 is a collection of all the functions extracted from the applications in database 110 and includes not only a function identifier for each function but other information such as a function signature, checksum, class name, parameters, similarity identifier, etc. Software module 140 is arranged to interact with function database 130 to compare all of its functions with one another in order to determine how similar these functions are to one another. Module 140 is also arranged to cluster these functions into common sets of functions that are found within the family of malicious applications.

Once at least one common function set has been identified within the family of malicious applications, a check functions software module 150 is arranged to check these functions to determine which are malicious in which are not. Those function sets that are deemed malicious are then stored within the function set blacklist database 160 for later reference.

Figure 2:
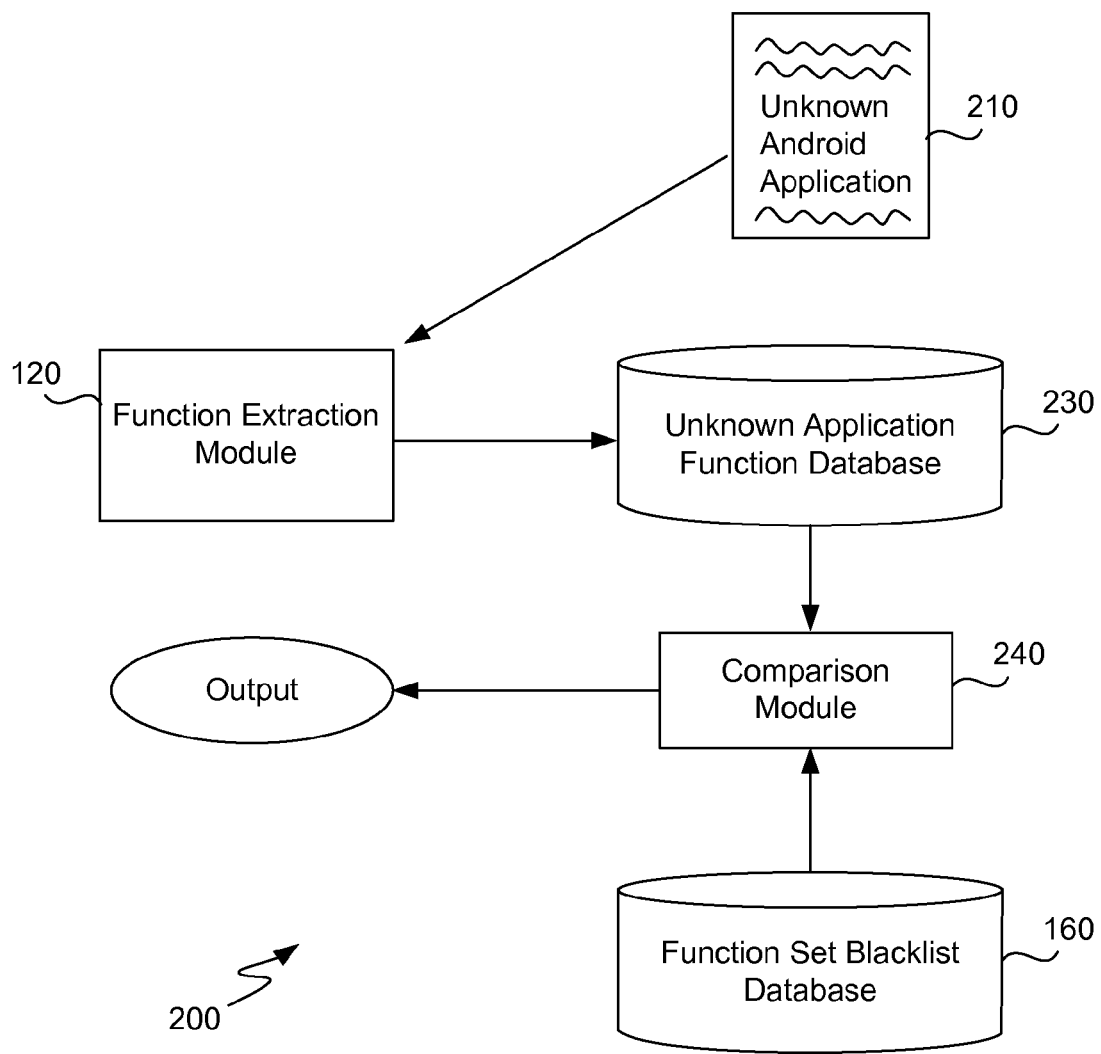
FIG. 2 is a block diagram for an application classification system according to one embodiment of the invention.

FIG. 2 is a block diagram for an application classification system 200 according to one embodiment of the invention. Software application 210 is an Android software application whose general purpose is unknown, i.e., it is unknown whether the application is malicious or not. The application may be obtained from "Google Play," for example, and from other third party sources.

Preferably the application is in its binary representation, although if the source code is obtained, the application may be compiled, assembled, translated etc., into its binary representation. By starting with an unknown application, its functions may be compared to a blacklist of function sets to determine whether or not the application is malicious.

Software module 120 is arranged to identify and extract the functions found within the application 210. Once extracted, these functions along with other identifying information may be stored within an unknown application function database 230. Database 230 is a collection of all the functions extracted from the unknown application and includes not only a function identifier for each function but other information such as a function signature, checksum, class name, parameters, similarity identifier etc. Software module 240 is arranged to interact with function database 230 in order to compare all of its functions with the function sets found within blacklist database 160 in order to determine how similar these functions are to one another. If at least one function set from database 160 is found to match with functions from the unknown application 210, then an output may be generated indicating that application 210 is malicious.

Create Blacklist Database

Figure 3:
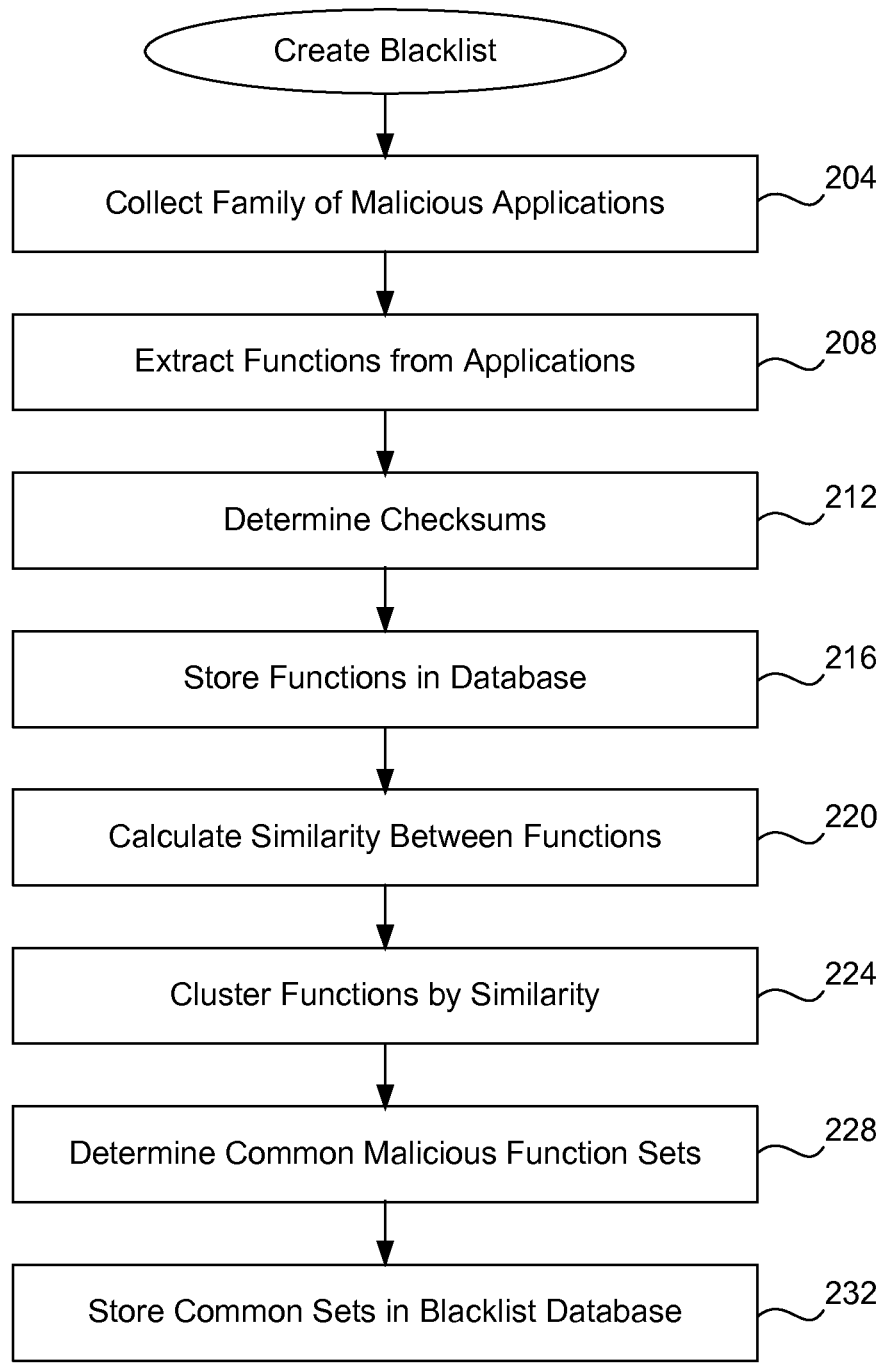
FIG. 3 is a flow diagram describing one embodiment by which a blacklist of malicious function sets is created.

FIG. 3 is a flow diagram describing one embodiment by which a blacklist of malicious function sets is created. In a first step 204 any number of malicious Android applications are collected and stored, for example, in database 110. In one particular embodiment, these malicious applications are all members of the same malware family, thus enabling malicious function sets to be determined that will identify malware from that malware family. Of course, FIG. 3 may be executed any number of times with different collections of malware from different malware families, thus enabling identification of these different malware families. These known malicious applications can be collected from various sources, such as public collections of malware, proprietary databases, etc. In one specific embodiment, malware is collected from the Trend Micro "Mobile Threat Response Team Database."

In step 208 the functions from these applications are extracted along with other related information in step 212. In one embodiment, the software tool "Androguard" is used to extract each function from an application along with related information.

The related information that is extracted along with each function includes: an identifier for the application that includes the function; a signature for each function; a checksum; the Java class name in which the function resides; the location of the function in the application; and the name of the function. As is known in the art, the signature for each function symbolically represents the structure of a function (representing the basic program blocks, if/condition branches, package/field access, etc.), and as used herein, the checksum is the ordered list of all the instructions of the function (e.g., the Android Dalvik byte code in the function). The signature combined with the checksum identifies a function.

In step 216 the extracted functions and the related information may be stored into database 130. In one particular embodiment, it is not necessary to store the actual functions themselves into the database, only the function identifiers and the related information (e.g., class name, function name, parameters/return value, signature, checksum, etc.).

FIG. 6 illustrates one embodiment of a function information table 610 that may be used to store function information into database 130. Shown is an identifier for the function 622, an identifier for the application 624, a signature of the function 626, a checksum for the function 628 (listing three instructions found in the function), the class name of the function 630, the name of the function 632, the parameters of the function 634 and a location for a similarity identifier 636 that will be added below in step 224. Of course, this function information may be stored in different forms within database 130. In this fashion, information relating to any of a number of extracted functions may be stored for later analysis. As is know, As known in the art, a function within a Java is the same as a method. Usually, a Java Class includes many functions, but a simple Java Class may have only one function. The signature of a method is based on the grammar described by Silvio Cesare:
Procedure::=StatementList
StatementList::=Statement|Statement|StatementList
Statement::
=BasicBlock|Return|Goto|If|Field|Package|String
Return::='R'
Goto::='G'
If::='I'
BasicBlock::=
Field::='F' '0' 'F' '1'
Package::='P' PackageNew|'P' PackageCall
PackageNew::='0'
PackageCall::='1'
PackageName::=Epsilon|Id
String::='S' Number|'S' Id
Number::=\d+
Id::=[a-zA-Z]\w+

Thus, the signature of a function will include the above identifiers "R," "B," "G," etc., and describes information about the structure of a method, rather than taking into account the different instructions. For example, given the Android code:
[ . . . ]
call [meth@ 22 Ljava/lang/String; valueOf
['(I)', 'Ljava/lang/String;']]
goto 50
the corresponding signature would be:
B[P1[Ljava/lang/String;  valueOf   (I)Ljava/lang/String;}G].
Thus, the signature does not necessarily take into account each instruction nor the nature of each instruction, but a higher level of abstraction concerning the structure of the instructions within the overall method.

As mentioned above, the "checksum" for each function is the sequence of instructions for each function, after removing information dependent upon compilation. An example of original Java code is as follows:
public void onCreate(Bundle paramBundle)
{
    super.onCreate(paramBundle);
    this.f=new t(this, this.c);
    this.e=new   AppLovinAdView(this.b,   AppLovinAdSize.INTERSTITIAL, this. a);
    this.e.setAdDisplayListener(new p(this));
    this.e.setAdLoadListener(new q(this));
    this.d=new TextView(this.a);
    this.g=new s(this);
    this.h=new r(this);
    b( );
}
And, its corresponding checksum is as follows:
invoke-supernew-instanceiget-objectinvoke-directiput-objectnew-instanceiget-objectsget-objectiget-objectinvoke-directiput-objectiget-objectnew-instanceinvoke-directinvoke-virtualiget-objectnew-instanceinvoke-    directinvoke-virtualnew-instanceiget-objectinvoke-directiput-objectnew-instanceinvoke-directiput-objectnew-instanceinvoke-directiput-objectinvoke-directreturn-void In step 220 module 140 is used to calculate the similarity between all the functions in database 130. If the actual binary code of the functions is not stored within database 130, then module 140 may access database 110, or any intermediate location used by module 120. In one embodiment, the Androguard software tool available on the Internet is used to calculate the similarity between functions, and specifically, the algorithm "export API: ncd( )" is used to compare the signatures and checksums of the functions in order to calculate their similarity. In other words, each function in database 130 is compared to all the other functions in the database and a similarity value is calculated for each comparison. In one specific embodiment, we calculate the signature similarity and the checksum similarity between two functions separately and then use the average value as the final similarity value for two functions using the formula:

$$Sim = (ncd(signature1, signature2) + ncd(checksum1, checksum2))/2.0$$

The range of values in a final similarity score is 0.0~1.0. The smaller value indicates more similarity.

In one embodiment, a similarity comparison table such as that shown in Table 1 may be created to assist with this step.

TABLE 1

| ID | FUN1_ID | FUN2_ID | Similarity |
|----|---------|---------|------------|
| 1  | 351     | 349     | 0.154813064031 |
| 2  | 352     | 347     | 0.203003875969 |

Table 1 shows in a first row that two functions are compared and their similarity value is approximately 0.155, while in a second row two different functions are compared and their similarity value is approximately 0.203. Preferably, a cutoff is used to indicate which functions shall be considered similar and which are not. In one specific embodiment, any similarity value of less than about 0.2 indicates that two functions are similar, while values above that cutoff indicate that two functions are not similar. Once two functions are considered similar (e.g., functions with the identifiers 351 and 349 of Table 1), then a unique similarity identifier is assigned to both of these functions and recorded in their corresponding function information table of FIG. 6. For example, the unique similarity identifier would be recorded in field 636 for both of the functions 351 and 349. Thus, the similarity identifier identifies functions that are so similar that they may be considered the same function. Since an application is composed of functions, we may also say that an application is composed of similarity identifiers. If a function is determined not to be similar to any other function then it is assigned its own unique similarity identifier.

Next, in step 224 module 140 iterates over all of the function information tables (or database records) of database 130 in order to cluster all the functions by similarity to determine which function sets are the most common in all of the malicious applications. Any suitable algorithm may be used to perform this iteration.

Figure 5:
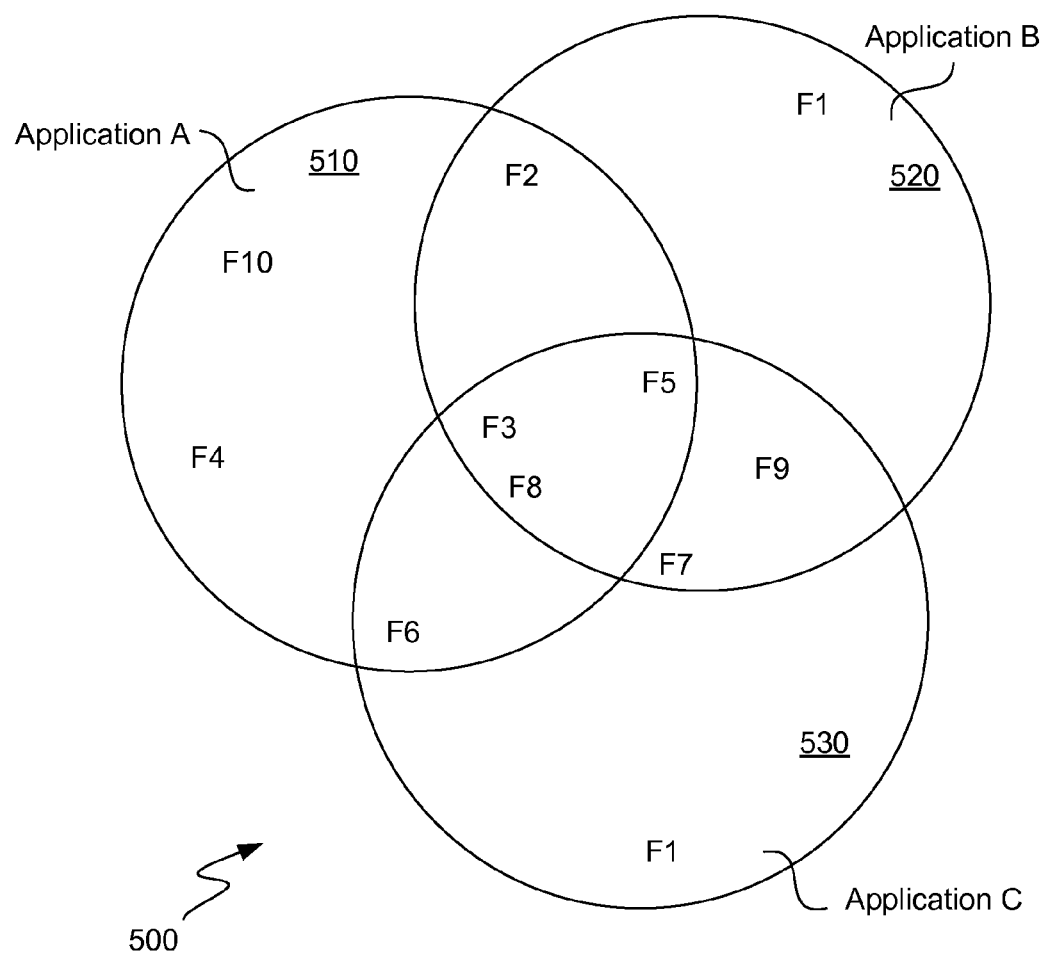
FIG. 5 is illustrates an example of clustering common functions of applications into a set of functions.

FIG. 5 illustrates an example 500 of clustering common functions of applications into a set of functions. In this example there are three applications 510, 520 and 530 each having a number of functions F1-F10. (In this example functions are identified by number instead of by similarity identifier.) As shown, the functions F3, F5 and F8 are each used by all three of the applications, while a function such as F4 is only used by application 510. Thus, a common function set is {F3, F5, F8}. Even the set {F7, F9} may be considered a common function set (although less common than the first function set) because this set is used by both applications 520 and 530. The above example assumes that each of the functions is different. If we introduce the concept of similarity, though, it is possible that the most common function set may be expanded. For example, assume that the functions F7, F9 and F10 are so similar that they may be considered the same function and that a similarity identifier "99" is assigned each one. Then, it may accurately be said that three applications do share another common function, namely a function (or any function) which is assigned the similarity identifier "99." In this situation, the most common function set would then be {F3, F5, F8, 99} because all of these functions are used by all the applications. Of course, functions F3, F5, F8 may each be designated by a unique numerical similarity identifier (as mentioned above) in order to make the contents of the set consistent.

In another example, consider four sample applications A, B, C and D, in which their functions have all been compared to one another and each function of each application has been assigned a similarity identifier, the similarity identifiers ranging from 1 up to 11. The contents of each application when identified by similarity identifier is then as follows.

Sample A: 1, 2, 2, 3, 4, 5, 6.
Sample B: 3, 4, 5, 7.
Sample C: 3, 4, 5, 8, 9.
Sample D: 2, 2, 6, 10, 11.

Note that the similarity identifier 2 appears twice in two of the samples because these applications have two functions which are similar. Thus, it may be determined that there are two common function sets among these sample applications, namely, {3, 4, 5} which appears three times, and {2, 2, 6} which appears two times. The first function set includes different functions, while the second function set action includes two functions that are similar and a third which is different.

In another example, 256 malicious Android applications were known to be of the malware family Android-OS_TROJSMS.BLK and were analyzed using the above technique. Partial results are shown in Table 2.

TABLE 2

| Class Name | Function Name | Sim_id |
|---|---|---|
| Lcom/Android/main/BaseAuthenicationHttpClient; | getStringByURL | 343 |
| Lcom/Android/main/BaseAuthenicationHttpClient; | getXboxStrByURL | 344 |
| Lcom/Android/main/FileUtil; | getDataSource | 353 |

As shown in Table 2, a function set of three functions was identified that occur in 173 of the 256 applications. These three functions are identified by the similarity identifiers 343, 344 and 353. Because it was determined that two of these functions are malicious, this function set will be added into the blacklist database.

FIG. 7 is a function sets table 640 that may be used to represent the function sets determined in step 224. As shown, the table may include any number of rows (records), each row indicating a function set identifier 642 the contents of the function set 644 (each function identified by a similarity identifier), and a field 646 indicating whether or not the functions in the function sets have been checked to determine if any are malicious or not. In this example, the function set identified by identifier 179 includes 11 similarity identifiers (representing 11 functions).

In step 228 the common malicious function sets are determined. For example, a cutoff may be used to determine whether a function set is considered "common." For example, if there are 100 applications in the database, a function set may not be considered common unless it appears in more than 50 of these applications. Next, it is determined whether or not a particular function set shall be considered malicious. In one embodiment, a function set is considered malicious if at least one function in the set is malicious. Whether or not a function is considered malicious may be determined in different manners. In one embodiment, each function is reviewed manually by a person in order to determine (based upon his or her experience) whether the function is malicious. The function may be reviewed manually by using table 610 to find the similarity identifiers that are included in the function set, then using the function identifier 622 to identify a particular function. Once identified, the binary code of the function may be disassembled in order to produce the function source code for review. Review is typically necessary because some functions may in fact come from a Java library and may not be malicious. If a function is considered malicious, and by extension, its function set is considered malicious, then in step 232 that malicious function set is added to a blacklist database 160.

FIG. 8 is an example of a blacklist table used to store malicious function sets within database 160. In this example, each table (or row) includes an identifier 662 and a function set identifier 664. For example, the function set identifier 179 identifies the function set of similarity identifiers shown in the first row of FIG. 7. Any unknown Android application that includes functions corresponding to function set 179 may very well be considered to be a malicious application. In another embodiment, the function sets of FIG. 7 may be stored directly in database 130 instead of just the function set identifiers.

Classify Unknown Application

Figure 4:
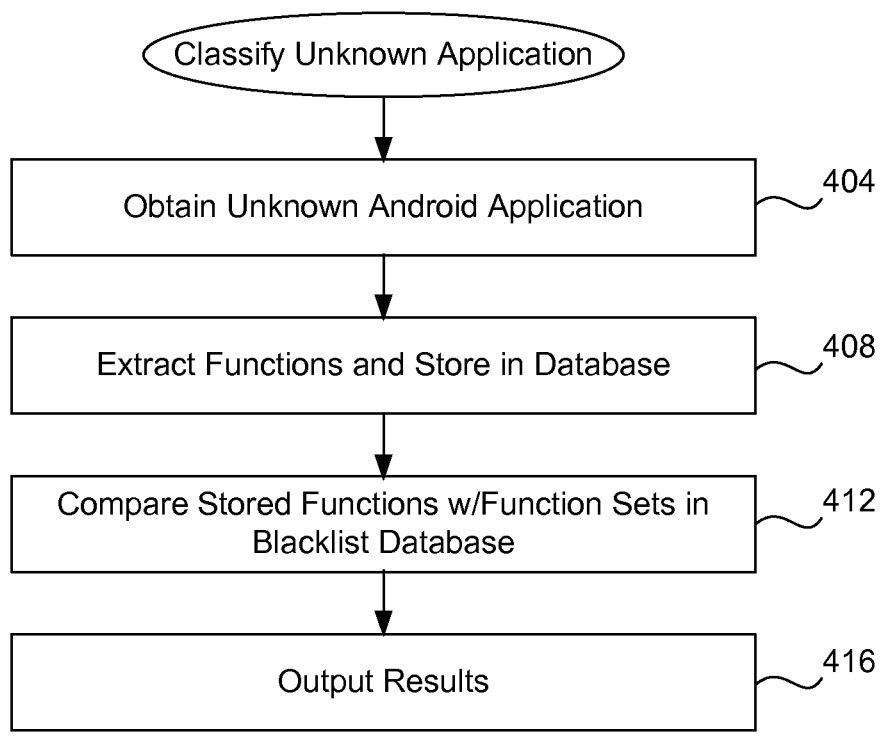
FIG. 4 is a flow diagram describing one embodiment by which an unknown software application is classified.

FIG. 4 is a flow diagram describing one embodiment by which an unknown software application is classified. In step 404 an Android application is obtained for which it is unknown whether or not it is malicious. This application may be obtained as described above. In step 408 the functions present in the unknown application are extracted and stored in database 230. If necessary, the source code of the application is first converted into its binary representation. The functions may be extracted in the same manner as discussed above in steps 208 and 212 and the functions and information may then be stored in database 230. Preferably, only the information concerning the functions is stored in the database.

Accordingly, each function found within unknown application 210 will have an entry in database 230 similar to the entry shown in FIG. 6 except that there is no need for a similarity identifier 636 because the functions of the unknown application do not need to be grouped together.

Next, in step 412 all the functions stored within database 230 are compared against the function sets found within blacklist database 160 in order to determine if any of the function sets (or similar functions) are found within application 210. In order to perform this comparison, the entries in unknown function database 230 may be compared against the information found within FIG. 8 (listing function set identifiers found within the blacklist), FIG. 7 (listing the similarity identifiers for each function set identifier), and FIG. 6 (providing function information corresponding to each similarity identifier). For example, FIG. 8 lists one function set identifier 179 found in the blacklist. By reference to FIG. 7, it is determined that function set identifier 179 corresponds to eleven different similarity identifiers each identifying different functions of that function set. Next, one may reference database 130 containing entries such as shown in the FIG. 6 in order to determine the actual functions corresponding to particular similarity identifiers. Thus, the function information corresponding to a particular similarity identifier, such as identifier 7539, may be obtained from database 130 and then compared against the function information for each of the functions found within unknown function database 230.

If it is determined that the unknown application includes a function (or similar function) matching each of the functions found within one of the function sets within the blacklist database, then it may be concluded that the unknown application is malicious. In other words, if the blacklist database includes a function set including similarity identifiers {11, 22, 33}, and the unknown application includes three functions A, B and C, and it is determined that function A is the same as or similar to a function from database 130 having the similarity identifier 11, and function B is the same as are similar to function from database 130 having the similarity identifier 22, and function C matches with similarity identifier 33, then it may be determined that the unknown application is malicious. In one embodiment, if the similarity identifier 11 represents three slightly different functions in database 130, the function A need only be compared to one of these functions and not all three; this is the case no matter how many functions similarity identifier 11 represents.

In one embodiment, comparison may be performed using a suitable algorithm from the Androguard software tool as described above. Thus, if a function set from the blacklist database is also found within the unknown function database 230 a result may be output in step 416 indicating that unknown application 210 is believed to be malicious. Also, because database 160 may be specific to a particular malware family (either because database 110 includes malicious applications specific to a malware family or because function sets within the blacklist database are grouped and flagged by malware family) an indication may also be output in step 416 indicating to which particular malware family it is believed that the unknown application belongs.

Figure 9:
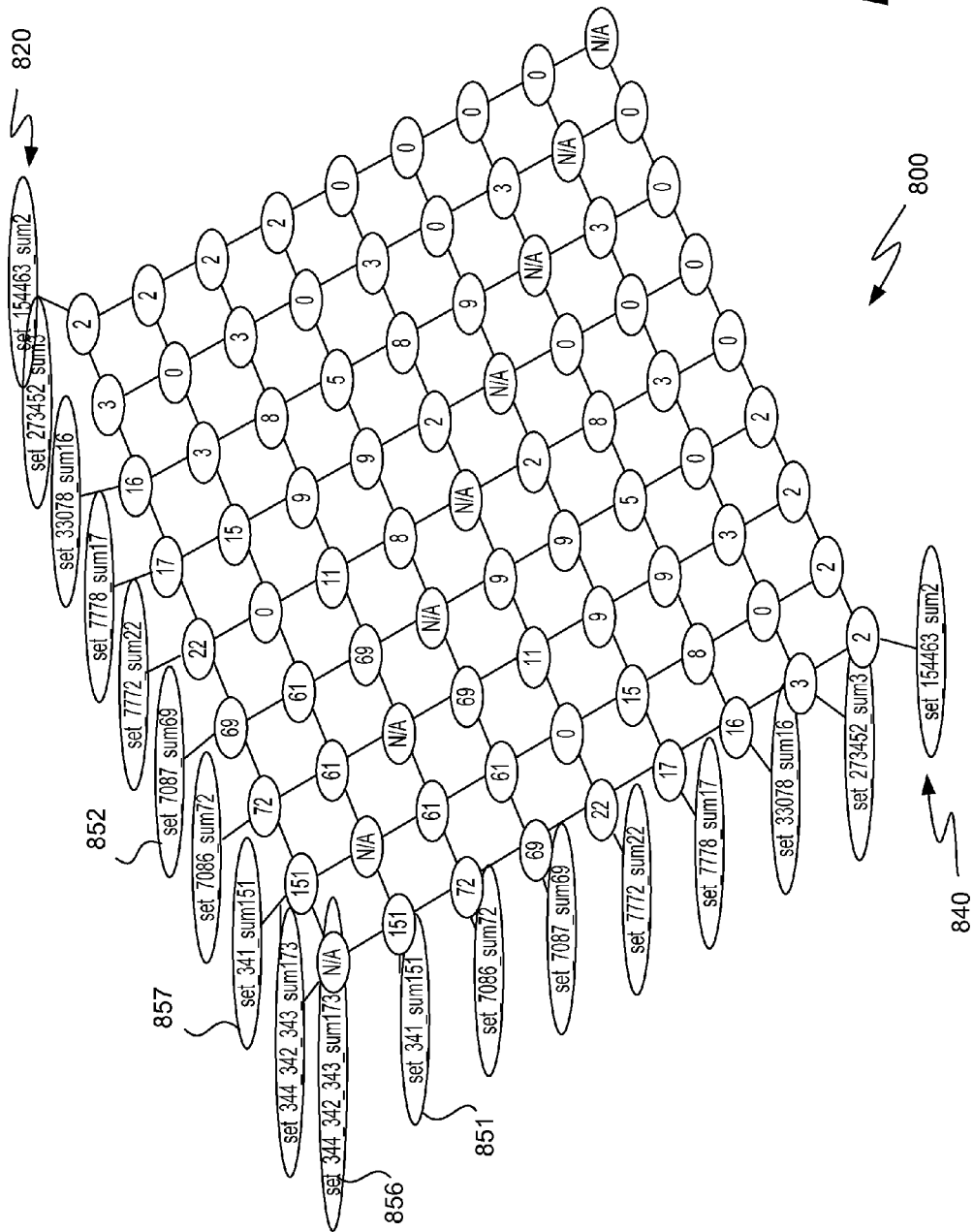
FIG. 9 is illustrates a graph showing overlap between function sets.

FIG. 9 illustrates a graph 800 showing overlap between function sets. It can be beneficial to determine if two different function sets always appear together in a certain number of applications. For example, graph 800 shows a row 820 listing a number of function sets found within a collection of 256 malicious Android applications. In this example, set 852 identifies a function or functions that occur 69 times within the 256 applications. Column 840 lists the same function sets as in row 820. Accordingly, the intersection of sets 851 and 852 indicates at 853 that these two function sets occur together in 61 applications out of the 256 applications. Compared to the rest of the graph, this is a fairly high number and may indicate that these two function sets belong to a particular library. Knowing that two function sets always appear together, or appear together quite often, may indicate that the function sets are benign, or least means that further analysis of these function sets is warranted. As shown at the intersection of sets 856 and 857 (set 856 appearing 173 times) there is an indication that these two sets appear together 151 times out of 256 applications. Because set 856 only appears in 173 of the applications, this means that most of the time set 856 is present with set 857, and that whenever set 857 is present that set 856 is also present. Such a high number indicates it is likely that these two sets are from a library.

When building a blacklist, and using these two sets as an example, it may be the case that neither function set can be judged malicious separately, but when combined their behavior is malicious. For example, function set 856 accesses a Web site, and function set 857 writes to an SD card. Separately, each function set is benign. But when combined, they exhibit command and control behavior and the function set combination should be added to the blacklist.

Computer System Embodiment

Figure 10A:
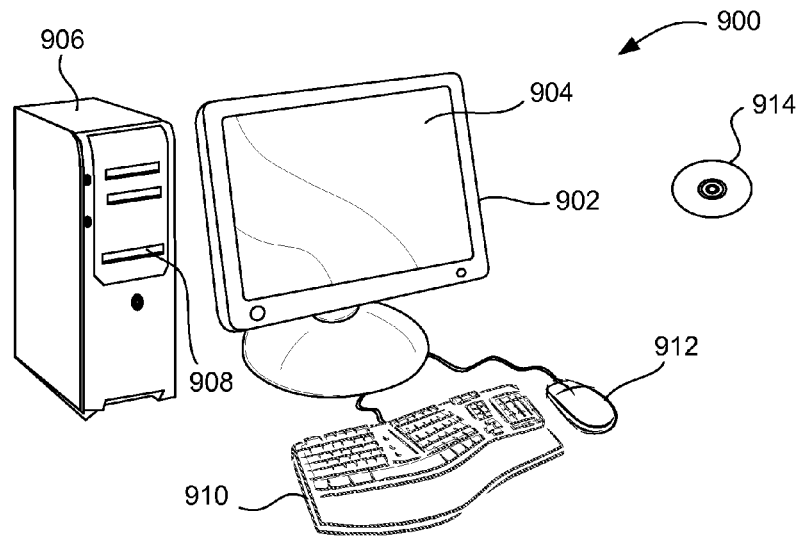
FIGS. 10A and 10B illustrate a computer system suitable for implementing embodiments of the present invention.
Figure 10B:
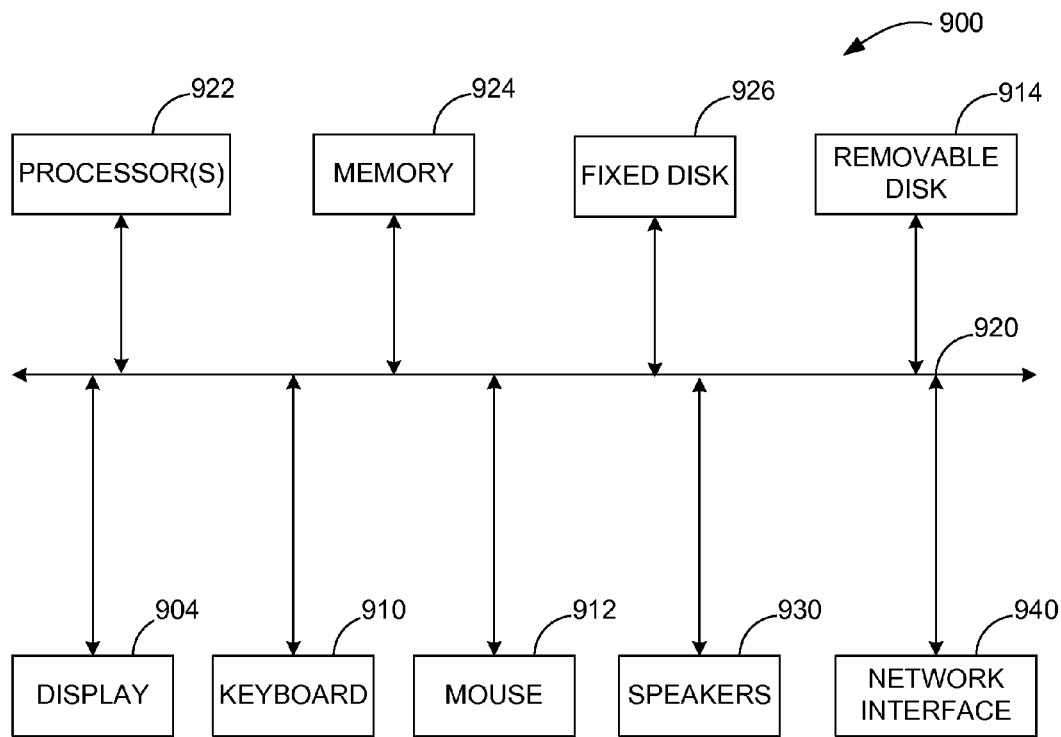

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of creating a blacklist to detect malicious software, said method comprising:
   receiving a plurality of known malicious software applications, each of said applications including a plurality of functions;
   extracting said functions from said malicious applications;
   comparing said functions to one another by comparing instructions of each of said functions and calculating a similarity value for each of said comparisons, each of said functions being compared with the remaining of said functions;
   clustering those of said compared functions that have a similarity value that is less than a threshold value together and determining that said clustered functions are similar to one another;
   determining at least one set of said functions that are in common between greater than at least three of said malicious applications, wherein one of said functions in said set is deemed to be present in one of said malicious applications because a similar function is present in said one malicious application, even though said one of said functions is not present in all of said malicious applications;
   determining that each of said functions in said set of functions is malicious before performing the step of adding; and
   adding an indication of said set of functions to a blacklist database, wherein said set of functions identifies a malicious application.

2. The method as recited in claim 1 wherein functions that are similar to one another are functionally equivalent.

3. The method as recited in claim 1 further comprising:
   adding a representation of each function in said set of functions to said blacklist database.

4. The method as recited in claim 1 further comprising:
   comparing said set of functions to functions extracted from an unknown software application and determining that each function in said set of functions is represented in said extracted functions; and
   outputting a result indicating that said unknown software application is malicious.

5. A method of creating a blacklist to detect malicious software, said method comprising:
   receiving a plurality of known malicious software applications, each of said applications including a plurality of functions;
   extracting said functions from said malicious applications;
   comparing said functions to one another by comparing instructions of each of said functions and calculating a similarity value for each of said comparisons, each of said functions being compared with the remaining of said functions;
   clustering said functions into groups;
   assigning a unique similarity identifier to each function in each group of said compared functions whose functions have a similarity value that is less than a threshold value, wherein functions within said each group have the same unique similarity identifier;
   determining at least one set of said similarity identifiers that are in common between greater than at least three of said malicious applications, wherein one of said functions having a similarity identifier in said set is deemed to be present in one of said malicious applications because a similar function is present in said one malicious application, even though said one of said functions is not present in all of said malicious applications;
   determining that a function corresponding to each of said unique similarity identifiers in said set of similarity identifiers is malicious before performing the step of adding; and
   adding said at least one set of said similarity identifiers to a blacklist database, wherein said at least one set of said similarity identifiers identifies a malicious application.

6. The method as recited in claim 5 wherein functions that are similar to one another are functionally equivalent.

7. The method as recited in claim 5 further comprising:
   comparing functions identified by said set of similarity identifiers to functions extracted from an unknown software application and determining that each function identified by said set of similarity identifiers is represented in said extracted functions; and
   outputting a result indicating that said unknown software application is malicious.

* * * * *